Oct. 19, 1954

J. LOVE 2,692,029

CONTROL VALVE FOR FLUID BRAKES

Filed April 23, 1952

Inventor
JOHN LOVE

Oct. 19, 1954 J. LOVE 2,692,029
CONTROL VALVE FOR FLUID BRAKES
Filed April 23, 1952 3 Sheets-Sheet 2

Inventor
JOHN LOVE
By *Lucke Lucke*
Attorney

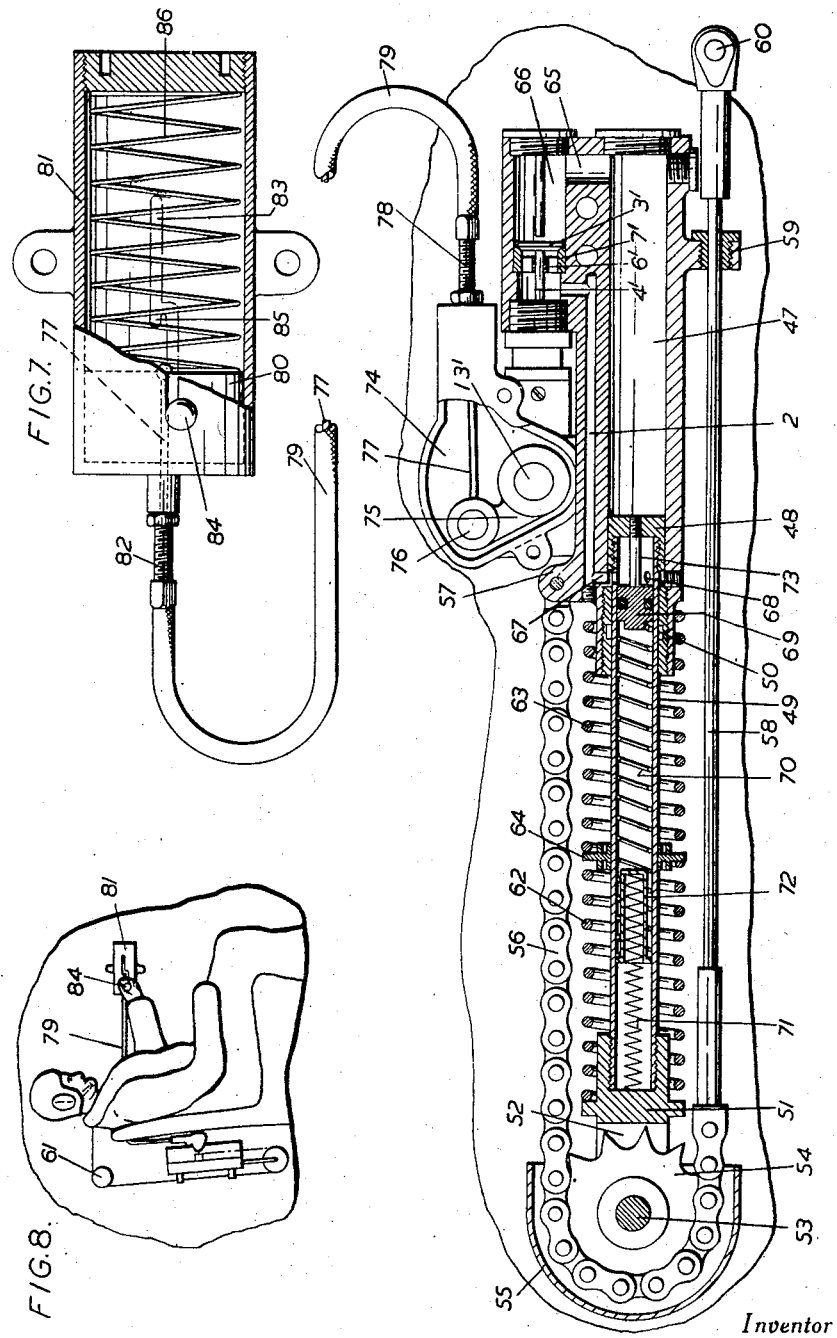

Patented Oct. 19, 1954

2,692,029

UNITED STATES PATENT OFFICE 2,692,029

CONTROL VALVE FOR FLUID BRAKES

John Love, Langside, Glasgow, Scotland, assignor to K. A. C. Limited, Glasgow, Scotland, a British company Application April 23, 1952, Serial No. 283,903

Claims priority, application Great Britain April 24, 1951

20 Claims. (Cl. 188—97)

This invention concerns control means for hydraulic apparatus and more particularly concerns control means for hydraulic apparatus for preventing, checking or controlling the relative movement between bodies which normally move together in unison.

Hydraulic apparatus for controlling the relative velocity in a predetermined direction between two bodies which normally move together in unison has been described in co-pending application Serial No. 119,972, filed October 6, 1949, and now Patent Number 2,607,581, the apparatus described in said application comprising liquid transferring means adapted to be attached to one of said bodies; coupling means for connecting the said liquid transferring means to the other of said bodies to cause the operation of said liquid transferring means as a result of relative movement occurring in the said predetermined direction between said bodies; a conduit connected to said liquid transferring means and constituting a flow-path through which liquid is forced upon operation of said liquid transferring means; and control means comprising a check valve located in said conduit; control spring means co-operating with said check valve normally to maintain the latter open, thereby to permit liquid to flow through said conduit in either direction; said check valve at least partially closing against the action of said control spring means in response to the pressure of liquid forced through said conduit by the said liquid transferring means to check the said flow of liquid when such flow exceeds a predetermined velocity, thereby to check the relative movement in said predetermined direction between the said bodies; and catch means co-operating with said control spring means to prevent the continued co-operation of said control spring means with said check valve subsequent to a liquid-flow-checking operation of the latter.

The apparatus described in Patent No. 2,607,581 is primarily for use with the safety harness of a pilot in an aircraft, the apparatus being so connected with the pilot's harness that, in normal flight, the pilot may move freely in his seat, but should the pilot tend to be thrown forwardly in his seat in excess of a predetermined velocity, owing, for example, to impact on landing or crashing, the apparatus automatically checks such forward movement.

A primary object of the present invention is to provide improved and simplified control means for hydraulic apparatus of the kind described in the said Patent No. 2,607,581, but it will be appreciated that the control means of this invention could readily be adapted for use with other forms of hydraulic apparatus for other purposes than that indicated above.

Accordingly, the present invention provides a control unit for hydraulic apparatus adapted to force liquid through a hydraulic circuit, such control unit comprising a conduit adapted for incorporation in said hydraulic circuit; a check valve in such conduit and responsive to liquid pressure therein; a push rod positioned to co-operate with said check valve and movable to open the latter; loading means urging said push rod in a check valve-opening direction thereby normally to maintain said check valve open; a control shaft supported for rotation about its own axis; and lost-motion linkage means connecting said control shaft to said push rod for moving the latter in the check valve-opening and closing directions upon rotation of the control shaft, said linkage means, for a predetermined rotational setting of said control shaft, permitting the push rod to move independently of the control shaft to enable said check valve at least partially to close against the action of said loading means and in response to liquid pressure in excess of a predetermined value acting on said check valve in a valve-closing direction, whilst moving said push rod and said linkage means to a stable condition of the latter in which said loading means are held against moving the push rod in the check valve-opening direction.

According to a further feature of this invention, the control shaft may be rotated from the said predetermined setting thereof to a second setting wherein the push rod is withdrawn in the valve-closing direction to render the influence of said loading means inoperative upon the check valve; whilst in a further rotational setting of the control shaft, the push rod may be held in such a position that the check valve will be prevented from moving in its closing direction irrespective of the pressure of liquid acting on the valve.

For convenience the aforesaid "predetermined," "second" and "further" settings of the control shaft will hereafter be referred to as the "auto lock," "manually locked," and "forced unlock" settings respectively.

Conveniently, the said linkage means may comprise a crank on said control shaft having limited freedom of movement about the axis thereof, and a link connecting said crank to the push rod; the said limited freedom of movement of the crank about the control shaft may be provided by furnishing one of these members with a key adapted to engage in a key way in the other of said members, the key way being of greater width than the said key.

Further features of the invention will appear from the following description of two embodiments thereof, shown in the accompanying drawings in which:

Figures 7 and 8 illustrate a control unit according to this invention applied to hydraulic apparatus of the kind described in Patent No. 2,607,581, Figure 8 showing, diagrammatically, a suitable disposition of the apparatus of Figure 7 with respect to a pilot and his seat in an aircraft.

Figure 1:
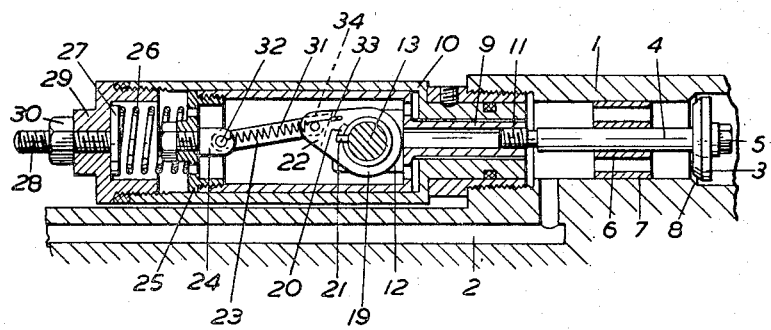
Figure 1 is a longitudinal sectional elevation of one embodiment of a control unit according to this invention.
Figure 2:
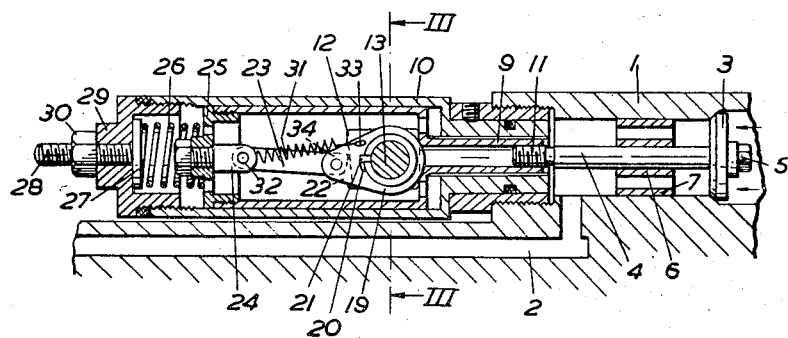
Figure 2 is a similar view to Figure 1, but showing the mechanism of the control unit in the condition thereof subsequent to a liquid-flow-checking operation of the check valve.
Figure 3:
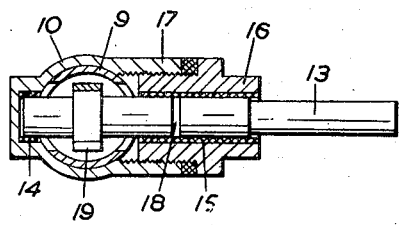
Figure 3 is a section on the line III—III of Figure 2.

Referring to Figures 1, 2 and 3 of the drawings, the control unit shown comprises a chamber 1 adapted to be incorporated in the hydraulic circuit of the apparatus with which the control unit is to be used; a part of such hydraulic circuit is indicated by the passage 2.

A check valve 3, of the poppet or mushroom type, is arranged within the chamber 1, this check valve having a stem 4 to which the valve head is secured by means of a nut 5, the stem 4 being axially slidable in a guide formed in the central boss 6 of a spider 7 rigidly mounted within the chamber 1. The check valve 3 is adapted, when closed, to co-operate with an annular seat 8 formed in the wall of the chamber 1.

A push rod 9, in the form of a stepped sleeve slidably arranged within a guide sleeve 10, is arranged co-axially with the stem 4 of the check valve 3, and at its front end is furnished with a tappet 11 which co-operates with the rear end of the stem 4, the tappet 11 being screwed into the end of the push rod 9.

The larger portion of the push rod 9 is furnished with ports 12 in its opposite sides, these ports serving to accommodate the passage of a control shaft 13, whose axis is arranged perpendicular to, and intersecting, the axis of the push rod 9; the ports 12 are elongated in the axial direction of the push rod to permit the latter to reciprocate in the guide sleeve 10 without fouling the control shaft 13.

The control shaft 13 is supported at one end in a bush 14 in the wall of the guide sleeve 10, and at its other end is journalled in a bush 15 in a plug 16 which is screwed into a boss 17 in the guide sleeve 10; the control shaft 13 is preferably peripherally grooved at 18 (as shown in Figure 3), this groove 18 serving to accommodate a sealing ring (not shown) for preventing egress of liquid from the interior of the guide sleeve 10 and the chamber 1.

The control shaft 13 is furnished within the push rod 9 with a crank 19 in the form of an eccentrically arranged lug, the crank 19 being rotatable upon the control shaft and being provided with a key way 20 adapted to engage a Woodruff key 21 carried by the control shaft. The key 21 is less in width than the key way 20 and hence crank 19 is permitted limited freedom of movement about the control shaft 13 for purposes hereinafter explained.

The crank 19 is furnished with a pair of jaws 22 between which is pivotally mounted a link 23, the rear end of the latter being pivotally connected between the limbs of a bifurcated-headed bolt 24 which is centrally secured to a plug 25 screwed into the rear end of the push rod 9. Thus rotation of the crank 19 causes reciprocation of the push rod The aforesaid loading means comprise a control spring 26 co-operating with the rear of the plug 25 and the disc-shaped head 27 of a bolt 28 which is screwed into a closure plug 29 at the rear end of the guide sleeve 10. The control spring 26 is of such a rate and strength that it will permit the check valve 3 to close in response to the pressure of liquid on the valve head when the liquid flow past such head in a valve-closing direction exceeds a predetermined velocity, for example corresponding to a predetermined relative velocity between two bodies (such as the pilot and his seat in an aircraft) whose relative velocity is to be controlled by the said hydraulic apparatus, and it will be appreciated that the bolt 28 serves as a means for adjusting the pressure of the spring 26 upon the plug 25; the adjusted position of the bolt 28 within the closure plug 29 is retained by means of a lock nut 30.

A pair of tension springs 31 are mounted, one one each side of the link 23, between the pivot pin 32 by which the link 23 is secured to the bolt 24, and anchorage means on the crank 19; the said anchorage means conveniently comprise a U-shaped rod passing through the crank 19 parallel to, and to one side of, the pivot axis of the link therein, the ends of the said U-shaped rod being forwardly-turned to form hooks 33 over which the front ends of the springs 31 are looped. The rear ends of the springs 31 are conveniently secured to the pivot pin 32 by being passed through holes therein.

In Figure 1, the control unit is shown in the aforesaid "auto lock" condition with the push rod 9 holding the check valve 3 open under the influence of the control spring 26; the crank 19 is displaced from its rear dead-centre position, the control shaft 13 being set so that the key 21 engages the lower end of the key way 20. Now, should the pressure on the check valve 3 in a valve-closing direction exceed the pressure of the control spring 26, the valve will close, urging the push rod 9 rearwardly and rotating the crank 19 to its rear dead-centre position; when the crank reaches this position, which it is free to do since the key on the control shaft does not prevent the movement of the crank to this position, the springs 31 cause the crank to continue rotating to just beyond the said dead-centre position, when a nub 34 on the link 23 engages the crank between the jaws thereof and prevents further rotation of the crank.

Thus the mechanism assumes the condition shown in Figure 2, and as will be apparent, the springs 31 maintain the crank and link 23 in this position irrespective of the pressure of the control spring 26 or of the pressure of liquid acting on the head of the check valve 3. Hence the check valve is relieved of the valve-opening tendency of the control spring 26 but nevertheless is free to open should the liquid pressure act upon the check valve in a valve-opening direction; moreover, after such re-opening of the check valve the slightest liquid pressure on the head of the valve will cause it to close again without restraint by the control spring 26.

To restore the influence of the control spring 26 upon the check valve 3, that is, to restore the crank 19 and the link 23 to the position shown in Figure 1, the control shaft 13 is rotated in a clockwise direction (as viewed in Figures 1 and 2) the key 21 engaging the upper end of the key way 20 and causing rotation of the crank 19 in the same direction past its rear dead-centre position. This operation is the aforesaid "forced unlocking," and if the control shaft is maintained in the said clockwise-rotated position, it will be appreciated the engagement of the key 21 with the upper end of the key way 20 prevents anti-clockwise rotation of the crank 19 and hence prevents closing of the check valve 3 irrespective of the pressure of liquid acting thereon.

To attain the "manually locked" setting of the control unit above described, the control shaft 13 is rotated in an anti-clockwise direction so that the crank 19 is rotated to just beyond its said rear dead-centre position when the nub 34 engages the crank and prevents its further rotation under the influence of the tension springs 31; in the "manually locked" position, the crank 19 and the link 23 occupy the positions shown in Figure 2, but the control shaft 13 is in a position such that the key 21 engages the lower end of the key way 20 and thus the crank 19 is maintained in its said position not only by the action of said springs 31, but also the said engagement of the key 21 with the key way 20.

It will be appreciated that when the control shaft is set in the said "auto lock" position and the crank and link "cracked," the said tension springs 31 assist the control spring 26 in maintaining the check valve open; thus, if desired, the tension springs 31 could be of sufficient strength and suitable rate to control the check valve unaided and the control spring 26 could be eliminated; alternatively, the tension springs 31 could be eliminated, since it will readily be understood that once the crank and link have attained their said rear dead-centre position, the control spring can exert no turning moment upon the crank and the latter will thus remain in its said dead-centre position. However, the provision of the said tension springs 31 is advantageous in that positive locking of the crank is obtained and the effects of the inertia of the crank and link assembly minimized.

Figure 4:
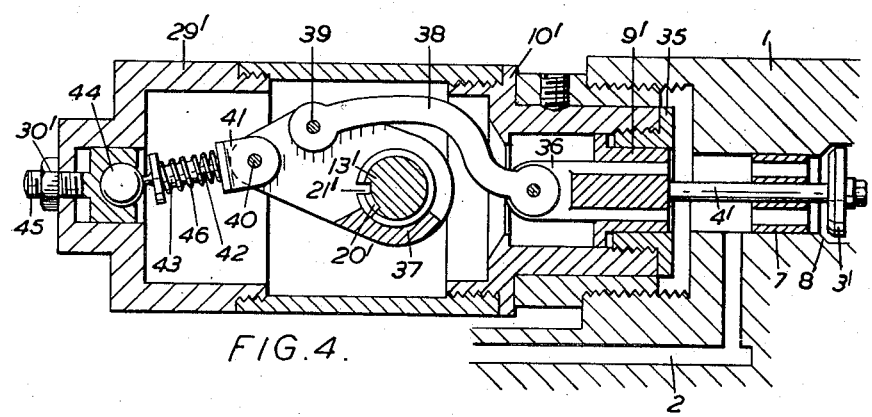
Figure 4 is a view corresponding to Figure 1, showing a second embodiment of a control unit according to this invention.
Figure 5:
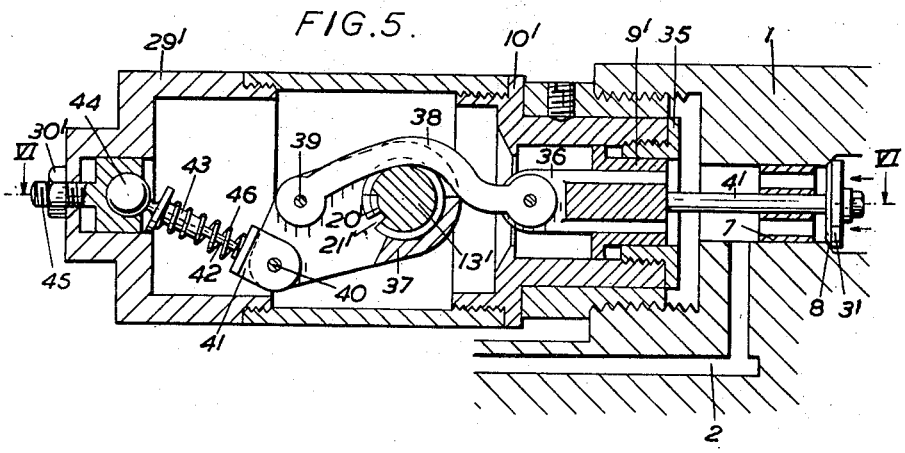
Figure 5 is a further view of the control unit of Figure 4, showing the mechanism thereof in the same condition as that shown in Figure 2.
Figure 6:
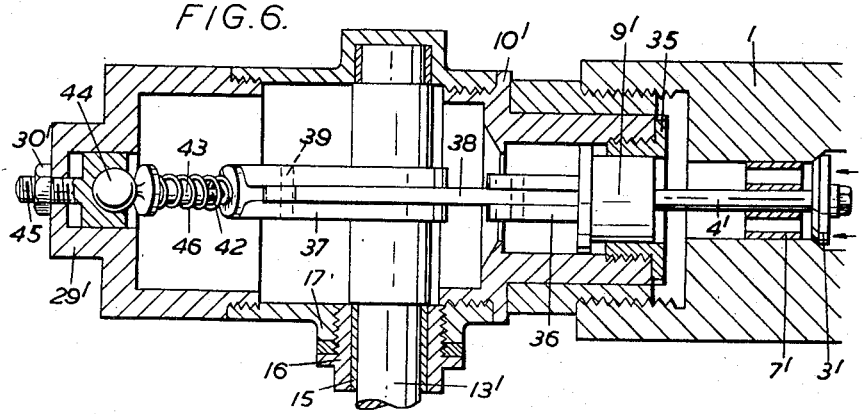
Figure 6 is a section on the line VI—VI of Figure 5.

A second embodiment of this invention, comprising a modification of the control unit described with reference to Figures 1 to 3, is shown in Figures 4, 5 and 6.

In this second embodiment, the check valve 3' is located in the chamber 1 by means of a spider 7 and is adapted to cooperate with an annular seat 8 as in the previous arrangement.

The push rod 9' in this case takes the form of a cylindrical plunger axially slidable in a bush 35 screwed into the front end of the guide sleeve 10', the front surface of the push rod being adapted to co-operate with the rear end of the valve stem 4', and the rear end of the push rod 9' being furnished with a pair of rearwardly extending lugs 36.

The control shaft 13' is located perpendicularly to the axis of the push rod 9' as in the previously described arrangement, the control shaft being journalled for rotation about its own axis.

The control shaft 13' carries a crank 37 which is rotatable upon the control shaft, its rotation thereon being limited by the key 21' co-operating with the ends of the key way 20'. The crank 37 is slotted on one of its sides to accommodate a connecting link 38, the front end of which is pivotally secured between the lugs 36 of the push rod 9'; the rear end of the link 38 is connected to the crank 37 by means of a pin 39. Thus upon rotation of the crank about the axis of the control shaft, the push rod 9' will be reciprocated within the guide sleeve 10'.

The crank 37 is furnished with a further pin 40 upon which is pivotally mounted a U-shaped element 41 from the rear end of which projects a rod 42 slidable telescopically in a tube 43. The latter is furnished at its rear end with a spherical ball 44 co-operating with a part-spherical seating having a rearwardly extending screw-threaded rod 45 screwed centrally into the rear closure plug 29'. A lock nut 30' is arranged, externally of the plug 29', upon the rod 45.

A control spring 46 is arranged coaxially about the rod and tube assembly 42—43 and, as in the case of the control spring 26, is of such a rate and strength that it will permit the check valve 3' to close in response to the pressure of liquid on the valve head when the liquid flow past such head in a valve-closing direction exceeds a predetermined velocity, and it will be seen that the rod 45 serves as a means for adjusting the pressure of the control spring 46 upon the element 41. The ball 44 and its seating permit adjustment of the rod 45 by screwing the latter in the plug 29' without displacement of the rod and tube assembly 42—43 about the axis thereof.

The operation of this modified control unit is as follows:

In Figure 4, the control unit is shown in the aforesaid "auto lock" condition with the push rod 9' holding the check valve 3' open under the influence of the control spring 46; the crank 37 is displaced from its rear dead-centre position, the control shaft 13' being set so that the key 21' engages the upper end of the key way 20'. Now, should the liquid pressure on the check valve 3' in the valve-closing direction exceed the valve-opening force exerted by the control spring 46, the valve will close, urging push rod 9' rearwardly and rotating crank 37 to the position shown in Figure 5, the key 21' moving in the key way 20'.

In this position it will be seen that the control spring 46 now holds the crank against rotation in the direction in which the push rod would be urged forwardly to re-open the valve 3' and hence the latter remains closed, being relieved of the valve-opening effort of the control spring. Nevertheless, the valve 3' is free to open should the liquid pressure act thereon in the valve-opening direction, but should the liquid pressure again act in the valve closing direction, the valve 3' will immediately close, being unhindered by the control spring 46.

To restore the influence of the control spring 46 upon the check valve 3', that is, to restore the crank 37 to the position shown in Figure 4, the control shaft 13' is rotated in a clockwise direction (as viewed in Figures 4 and 5), and the lower end of the key way 20' engages the key 21' and causes rotation of the crank 37. This operation is the aforesaid "forced unlocking," and if the control shaft 13' is maintained in its said clockwise-rotated position, it will be seen that the engagement of the lower end of the key way 20' with the key 21' prevents anti-clockwise rotation of the crank 37 and hence prevents closing of the check valve 3' irrespective of the pressure of liquid acting thereon.

To attain the "manually locked" setting of the control unit, the control shaft 13' is rotated in an anti-clockwise direction so that crank 37 is rotated to the position shown in Figure 5; in this case, the key 21' will be engaged by the upper end of the key way 20' but rotation of the crank 37 to a position beyond that shown in Figure 5 is prevented by the engagement of the under surface of link 38 with the control shaft 13'.

It has been found that a desirable arrangement of the parts of the above-described second embodiment is such that engagement of the under surface of the link 38 with the control shaft 13' occurs when the pin 39 has been rotated 2° beyond the plane containing the axes of the push rod 9' and the control shaft 13', in an anti-clockwise direction; this arrangement ensures that inertia forces acting on the push rod and link 38 in a forwards direction will be incapable of rotating the crank in a clockwise direction to open the valve, since such forces will tend to rotate the crank 37 anticlockwise, that is, to maintain it in the "locked" position.

To enable a light control spring to be used which will nevertheless have a sufficient moment about the axis of the control shaft 13' to hold the valve 3' open against the liquid pressures generated by normal movement of the bodies controlled by the said hydraulic apparatus, the pin 40 is preferably so disposed that in the condition of the apparatus shown in Figure 4, the pin 40 has its axis in a plane which makes an angle of 10° with the said plane containing the axes of the push rod 5' and the control shaft. It will be appreciated that with this arrangement, the extreme position of pin 40 in the anti-clockwise direction will be 28° beyond the said plane containing the axes of the push rod and the control shaft so that the control spring 46 has a considerable "locking" moment about the control shaft when the unit is in a locked condition.

Rotation of the control shaft 13 or 13' to the three aforesaid settings thereof may be accomplished in any suitable manner, for example, manually, for which purpose the outer end of the control shaft may be furnished with a knob or other means to enable it to be easily grasped. However, the control shaft is advantageously operable by remote control means, for example, as shown in Figure 7.

Figure 7 illustrates hydraulic apparatus for controlling the relative movement between a pilot and his seat in an aircraft, such hydraulic apparatus being of the kind described in Patent No. 2,607,581 but incorporating a control unit of the kind hereinbefore described. Thus it will be seen that the hydraulic apparatus comprises liquid transferring or liquid pumping means including a cylinder 47 adapted to be rigidly secured to the structure of an aeroplane or a fixed part thereof, such as a seat; Figure 8 shows diagrammatically how the apparatus would be positioned with respect to a pilot's seat in an aircraft, the apparatus either being mounted on the seat or on the structure of the aircraft adjacent the rear of the pilot's seat.

A piston 48 is reciprocably mounted within the cylinder 47, being screwed on the end of a tubular piston rod 49 which passes through a liquid-tight gland 50 at the rear end (the left-hand end in Figure 7) of the cylinder 47.

The end of the piston rod 49 remote from that carrying the piston 48 carries a cap 51 screwed thereon and having a bifurcated rear end 52 carrying a horizontal spindle 53 upon which is mounted a sprocket wheel 54 which is free to rotate about the spindle 53.

A protective cover 55 shrouds the sprocket wheel 54, the cover 55 being suitably supported upon a cap 51.

A chain 56 passes over the sprocket wheel 54 and is attached at one of its ends to a lug 57 and at its other end to a coupling rod 58 mounted for guided axial movement in a lug 59 on the cylinder 47. The front end of the coupling rod 58 is furnished with an eye 60 to which the pilot's safety harness may be attached through the medium of a flexible cable or the like; where the apparatus is mounted as shown in Figure 8, the said flexible cable will pass over a pulley 61 in order that movement of the pilot forwardly and backwardly in his seat will produce an axial movement of the coupling rod 58.

If desired, the chain 56 could be replaced by a cable, ribbon or other suitable flexible member, in which case the sprocket wheel 54 could be replaced by a pulley or a drum.

It will be seen that forward movement of the pilot relatively to his seat will effect a forward movement of the piston 48 into the cylinder 47 by a distance equal to half that moved by the pilot; the return of the piston 48 to its rear extreme position upon rearward movement of the pilot is conveniently effected by means of a pair of springs 62 and 63 arranged co-axially about the piston rod 49 and positioned between the end of the cylinder 47 and the cap 51 at the rear of the piston rod 49. A thrust collar 64 preferably supports the adjacent ends of the springs 62 and 63 in order to prevent buckling of the springs upon compression which might hinder the movement of the piston rod 49 towards the cylinder 47.

The cylinder 47 is filled with hydraulic liquid, e. g. oil, and the front end of this cylinder is furnished with an outlet passage 65 which leads into a chamber 66. The rear end of the cylinder 47 is open to a bore 67 communicating with the passage 2 which terminates in the chamber 66. Thus on movement of the piston 48 into a cylinder 47, the liquid contained in the cylinder is forced through the outlet passage 65 into the chamber 66 and thence via passage 2 and bore 67 to the rear end of the cylinder 47 behind the piston 48. This liquid is forced within the tubular piston rod 5 via ports 68.

A compensating piston 69 is arranged reciprocably within the piston rod 49, this piston 69 being driven rearwardly, as liquid enters the piston rod 49 through the ports 68, and compressing a pair of coaxial springs 70 and 71 arranged between the compensating piston 69 and the inner wall of the cap 61; the springs 70 and 71 coact through the medium of a stabilising cup 72, the front end of spring 71 engaging the bottom of the cup 72 and the rear end of spring 70 surrounding the cup 72 and engaging a peripheral flange on the rear end of the latter. The compensating piston 69 is prevented from moving forwardly beyond the ports 68 by a rearwardly projecting stop pin 73 carried by the piston 48.

It will be seen that the provision of the compensating piston 69 enables all the parts of the apparatus through and into which liquid is forced to be maintained full of liquid and air eliminated from the hydraulic circuit; thus frothing of the liquid is prevented.

The control unit for the above-described apparatus may be of either of the forms described in connection with Figures 1 to 3 and 4 to 6 respectively; for convenience, it will be assumed that the control unit is of the form described in connection with Figures 4 to 6 and the aforesaid chamber 66 corresponds with the chamber 1 of the control unit illustrated in the said figures. It will be observed that the chamber 66 is formed integrally with the body defining the cylinder 47, but it is to be understood that the chamber 1 of the control unit shown in Figures 4 to 6 could be formed in an individual housing and connected into the hydraulic circuit of the apparatus, e. g. by connection to the outlet passage 65 and the bore 67, through rigid or flexible pipes or hoses. The space available for housing the equipment will, of course, influence the choice between the use of integral or remote control units for the hydraulic apparatus.

As shown in Figure 7, the control shaft 13' extends into a quadrantal housing 74, the cover of which has been broken away to show the mechanism within the housing. The control shaft 13' carries a lever 75 which is keyed or otherwise secured to it, the extremity of the lever 75 forming trunnions receiving a nipple 76 fixed on the end of a flexible control cable 77; the front end of the housing 74 is bored for the passage of the control cable 77 and forms a seating for an adjustable stop 78 for the outer cover 79 of the cable 77.

The lever 75 is positioned on the control shaft 13' such that with the lever 75 in the extreme position shown in the drawing, the control shaft is in its aforesaid "manually locked" setting; when the cable 77 is pulled into its outer cover 79, the lever 75 and the shaft 13' will be moved first to the said "auto lock" setting of the latter and then to the "forced unlock" setting, this latter setting of the control shaft being attained when the lever 75 has reached its other extreme position in the housing 74. Spring return means, e. g. a spiral spring (not shown) arranged within the housing 74, is provided to urge the lever 75 towards the position shown in the drawing, thus maintaining tension in the cable 77 and ensuring that the control shaft 13' shall return to its said "manually locked" setting in the event of breakage of the cable 77.

Movement of the cable 77 within its cover 79 to effect movement of the lever 75 in the housing 74 may be effected by any suitable mechanism; conveniently however, the end of the cable 77 is secured to a piston 80 reciprocably arranged in a cylindrical housing 81 furnished with lugs by which it may be secured to suitable structure at hand to the pilot. The housing 81, which may be formed by rolling a suitably shaped piece of sheet metal, is closed at each of its ends, one end being furnished with a passage for the cable 77 and being adapted to receive an adjustable stop 82 for the end of the outer cover 79.

The housing 81 is slotted as shown at 83 to form a gate for the stem of an operating lever 84 carried by the piston 80. The said gate is dimensioned so that when the lever 84 is moved to engage the notch 85, the lever 75 and control shaft 13' are moved to the aforesaid "auto lock" setting.

The housing 81 also contains a compression spring 86 coacting with the piston 80 and serving to urge the latter to the position shown in the drawing; it will be apparent that this spring 86 fulfils two objects, namely to assist return of the piston towards the position shown, thereby to minimise the effect of friction in the mechanism, and to ensure that the lever 84 shall be returned to engage the notch 85 when released by the pilot after movement to the extreme position opposite that shown, that is, to ensure that the apparatus cannot unwittingly be left with the control shaft 13' in its "forced unlock" setting but will always be automatically returned from this setting to the "auto lock" setting after forced unlocking.

It will be appreciated that the above-described control units may be modified in various ways; for example, whilst the control shaft 13 or 13' may be arranged with its axis perpendicular to and intersecting the axis of the push rod 9 or 9', as shown in the drawings, it may be disposed in any other suitable manner, the crank 19 or 37 being modified to suit any particular arrangement of the control shaft.

Thus, if desired, the control shaft may have its axis parallel to, or be coaxial with, the push rod 9 or 9', and the crank 19 or 37 be replaced by a swash-plate or an oblique crank secured to the control shaft with limited freedom of rotation thereabout, the push rod or a tappet associated therewith bearing on said swash-plate or oblique crank. This arrangement is particularly advantageous where the hydraulic apparatus is to be used in aircraft fitted with "ejector" seats, since in these circumstances the apparatus must project as little as possible from the rear of the seat, and the location of the axis of the control shaft in a direction parallel with the length of the apparatus ensures that the apparatus has the minimum girth.

I claim:

1. For hydraulic apparatus adapted to force liquid through a hydraulic circuit, a control unit comprising a conduit adapted for incorporation in said hydraulic circuit; a check valve in such conduit and responsive to liquid pressure therein; a push rod positioned to co-operate with said check valve and movable to open the latter; loading means urging said push rod in a check valve-opening direction thereby normally to maintain said check valve open; a control shaft supported for rotation about its own axis; and lost-motion linkage means connecting said control shaft to said push rod for moving the latter in the check valve-opening and closing directions upon rotation of the control shaft, said linkage means, for a predetermined rotational setting of said control shaft, permitting the push rod to move independently of the control shaft to enable said check valve at least partially to close against the action of said loading means and in response to liquid pressure in excess of a predetermined value acting on said check valve in a valve-closing direction whilst moving said push rod and said linkage means to a stable condition of the latter in which said loading means are held against moving the push rod in the check valve-opening direction.

2. A control unit according to claim 1, said control shaft having a second setting and rotation of the control shaft to such second setting withdrawing said push rod in the check valve-closing direction, thereby relieving the check valve of the influence of said loading means, and moving said linkage means to said stable condition thereof.

3. A control unit according to claim 1, said control shaft having a further setting in which movement of the push rod in the check valve-closing direction is restricted and said at least partial closure of the check valve thereby prevented.

4. A control unit according to claim 1 in which said linkage means comprise a crank on said control shaft and a link connecting said crank to said push rod, said crank having a limited freedom of rotation with respect to said control shaft.

5. A control unit according to claim 4 in which said crank is journalled upon said control shaft with a lost-motion connection between these members comprising a longitudinal key on one member engaging a key way in the other member, said key way being of greater width than said key.

6. For hydraulic apparatus adapted to force liquid through a hydraulic circuit, a control unit comprising a conduit adapted for incorporation in said hydraulic circuit; a check valve in such conduit and responsive to liquid pressure therein; a push rod positioned to co-operate with said check valve and movable to open the latter; loading means urging said push rod in a check valve-opening direction, thereby normally to maintain said check valve open; a control shaft supported for rotation about its own axis; a crank rotatable about the axis of said control shaft; a lost-motion connection between said crank and said control shaft comprising a longitudinal key on one of these members engaging a key way in the other member, said key way being of greater width than said key to furnish said crank with limited freedom of rotation with respect to said control shaft; a link connecting said crank to said push rod for moving the latter in the check valve-opening and closing directions upon rotation of said crank; said lost-motion connection, for a predetermined setting of said control shaft, permitting movement of said crank, link and push rod with said check valve to an at least partially closed condition of the latter against the influence of said loading means and in response to liquid pressure in excess of a predetermined value acting on said check valve in a valve-closing direction, such movement terminating in a stable over-dead-centre condition of said crank and link in which the push rod is held against movement in the said check valve-opening direction under the action of said loading means.

7. A control unit according to claim 6, including a guide sleeve for said push rod, said loading means comprising a control spring acting against said push rod, means for adjusting the thrust of said control spring being carried by said guide sleeve.

8. A control unit according to claim 6, including at least one spring acting between said push rod and said crank and adapted resiliently to hold said crank and link in their said over-dead-centre condition when such condition has been attained.

9. A control unit according to claim 6 in which rotation of said control shaft to a second setting thereof moves said crank and link to their said over-dead-centre condition, such second setting of the control shaft positioning said key and key way to prevent the crank and link leaving their said condition.

10. A control unit according to claim 9 in which rotation of said control shaft to a further setting positions said key and key way to prevent movement of the crank and link to their said over-dead-centre condition, thereby preventing said push rod and check valve from movement in the check valve-closing direction.

11. A control unit according to claim 10, including a nub on said link adapted to abut said crank and prevent rotation thereof beyond said over-dead-centre condition of the crank and link.

12. A control unit according to claim 11, including a lever on said control shaft; a cable secured at one end to said lever and guided so that tensioning said cable moves said lever and said control shaft about the axis of the latter; spring return means urging said control shaft towards said second setting thereof; a piston connected to the other end of said cable; a housing in which said piston is reciprocable to tension said cable and thereby effect movement of said lever; an operating lever on said piston extending externally of said housing and by which said piston may be reciprocated in said housing; and a gate on said housing for guiding said operating lever, said gate being shaped releasably to retain said operating lever in positions in which the piston and cable hold said lever and control shaft in said predetermined and second settings respectively, whilst permitting said operating lever to be moved to a position corresponding to said further setting of the control shaft.

13. For hydraulic apparatus adapted to force liquid through a hydraulic circuit, a control unit comprising a conduit adapted for incorporation in said hydraulic circuit; a check valve in such conduit and responsive to liquid pressure therein; a push rod positioned to co-operate with said check valve and movable to open the latter; a control shaft supported for rotation about its own axis; a crank rotatable about the axis of said control shaft; a lost-motion connection between said crank and said control shaft comprising a longitudinal key on one of these members engaging a key way in the other member, said key way being of greater width than said key to furnish the crank with limited freedom of rotation with respect to said control shaft; a link connecting said crank to said push rod for moving the latter in check valve-opening and closing directions upon rotation of said crank; a guide sleeve within which said push rod is reciprocable in said check valve-opening and closing directions; a control spring co-operating with said crank and tending normally to rotate the latter in the direction in which said push rod is moved in the check valve-opening direction, thereby normally to maintain the check valve open; means on said guide sleeve for adjusting the influence of said control spring upon said crank; and said lost-motion connection, for a predetermined setting of said control shaft, permitting movement of said crank, link and push rod with said check valve to an at least partially closed condition of the latter in response to liquid pressure in excess of a predetermined value acting on said check valve in a valve-closing direction, such movement terminating in an over-dead-centre condition of said crank and control spring in which the latter holds the crank resiliently against rotation in the said direction corresponding to movement of the push rod in the check valve-opening direction.

14. A control unit according to claim 13, including a pair of axially relatively movable elements, one of such elements being secured to said crank and the other being supported by said control spring-adjusting means, said control spring acting between said elements and urging said elements axially with respect to each other.

15. A control unit according to claim 14 in which said elements are telescopically associated, said control spring comprising a helical compression spring arranged coaxially about the elements and urging the latter apart.

16. A control unit according to claim 15 in which rotation of said control shaft to a second setting thereof moves said crank and control spring to the said over-dead-centre condition thereof, such second setting of the control shaft positioning said key and key way to prevent the crank and control spring leaving their said condition.

17. A control unit according to claim 16 in which rotation of said control shaft to a further setting positions said key and key way to prevent movement of the crank and control spring towards their said over-dead-centre condition, thereby preventing said push rod and check valve from movement in the check valve-closing direction.

18. A control unit according to claim 17, including a lever on said control shaft; a cable secured at one end to said lever and guided so that tensioning said cable moves said lever and said control shaft about the axis of the latter; spring return means urging said control shaft towards said second setting thereof; a piston connected to the other end of said cable; a housing in which said piston is reciprocable to tension said cable and thereby effect movement of said lever; an operating lever on said piston extending externally of said housing and by which said piston may be reciprocated in said housing; and a gate on said housing for guiding said operating lever, said gate being shaped releasably to retain said operating lever in positions in which the piston and cable hold said lever and control shaft in said predetermined and second settings respectively, whilst permitting said operating lever to be moved to a position corresponding to said further setting of the control shaft.

19. Hydraulic apparatus for controlling the relative velocity in a predetermined direction between two bodies which normally move together in unison, such apparatus comprising liquid pumping means adapted to be attached to one of said bodies, and including a pumping element; coupling means for connecting the said pumping element to the other of said bodies to cause the operation of said pumping means as a result of relative movement occurring in said predetermined direction between said bodies, thereby to force liquid through a hydraulic circuit; a conduit constituting at least part of said hydraulic circuit; a check valve in such conduit and responsive to liquid pressure therein; a push rod positioned to co-operate with said check valve and movable to open the latter; loading means urging said push rod in a check valve-opening direction, thereby normally to maintain said check valve open; a control shaft supported for rotation about its own axis; a crank rotatable about the axis of said control shaft; a lost-motion connection between said crank and said control shaft comprising a longitudinal key on one of these members engaging a key way in the other member, said key way being of greater width than said key to furnish said crank with limited freedom of rotation with respect to said control shaft; a link connecting said crank to said push rod for moving the latter in the check valve-opening and closing directions upon rotation of said crank; said lost-motion connection, for a predetermined setting of said control shaft, permitting movement of said crank, link and push rod with said check valve to an at least partially closed condition of the latter against the influence of said loading means and in response to liquid pressure in excess of a predetermined value acting on said check valve in a valve-closing direction, such movement terminating in a stable over-dead-centre condition of said crank and link in which the push rod is held against movement in the said check valve-opening direction under the action of said loading means.

20. Hydraulic apparatus for controlling the relative velocity in a predetermined direction between two bodies which normally move together in unison, such apparatus comprising liquid pumping means adapted to be attached to one of said bodies, and including a pumping element; coupling means for connecting the said pumping element to the other of said bodies to cause the operation of said pumping means as a result of relative movement occurring in said predetermined direction between said bodies, thereby to force liquid through a hydraulic circuit; a conduit constituting at least part of said hydraulic circuit; a check valve in such conduit and responsive to liquid pressure therein; a push rod positioned to co-operate with said check valve and movable to open the latter; a control shaft supported for rotation about its own axis; a crank rotatable about the axis of said control shaft; a lost-motion connection between said crank and said control shaft comprising a longitudinal key on one of these members engaging a key way in the other member, said key way being of greater width than said key to furnish the crank with limited freedom of rotation with respect to said control shaft; a link connecting said crank to said push rod for moving the latter in check valve-opening and closing directions upon rotation of said crank; a guide sleeve within which said push rod is reciprocable in said check valve-opening and closing directions; a control spring co-operating with said crank and tending normally to rotate the latter in the direction in which said push rod is moved in the check valve-opening direction thereby normally to maintain the check valve open; means on said guide sleeve for adjusting the influence of said control spring upon said crank; and said lost-motion connection, for a predetermined setting of said control shaft, permitting movement of said crank, link and push rod with said check valve to an at least partially closed condition of the latter in response to liquid pressure in excess of a predetermined value acting on said check valve in a valve-closing direction, such movement terminating in an over-dead-centre condition of said crank and control spring in which the latter holds the crank resiliently against rotation in the said direction corresponding to movement of the push rod in the check valve-opening direction.

References Cited in the file of this patent

UNITED STATES PATENTS

| Number | Name | Date |
|---|---|---|
| 862,147 | Ellis | Aug. 6, 1907 |
| 1,067,633 | Zander | July 15, 1913 |
| 1,922,928 | Cave | Aug. 15, 1933 |
| 2,073,751 | Niesemann | Mar. 16, 1937 |
| 2,339,378 | Clench et al. | Jan. 18, 1944 |
| 2,607,581 | Love et al. | Aug. 19, 1952 |

FOREIGN PATENTS

| Number | Country | Date |
|---|---|---|
| 308,517 | Italy | of 1933 |